United States Patent
Ellsworth et al.

(10) Patent No.: US 7,296,815 B2
(45) Date of Patent: Nov. 20, 2007

(54) BICYCLE SUSPENSION APPARATUS AND RELATED METHOD

(75) Inventors: Anthony S. Ellsworth, 16225 Highland Trails Dr., Ramona, CA (US) 92065; Mike Kojima, Cypress, CA (US)

(73) Assignee: Anthony S. Ellsworth, Ramona, CA (US)

( * ) Notice: Subject to any disclaimer, the term of this patent is extended or adjusted under 35 U.S.C. 154(b) by 183 days.

(21) Appl. No.: 11/194,923

(22) Filed: Aug. 1, 2005

(65) Prior Publication Data

US 2006/0022429 A1 Feb. 2, 2006

Related U.S. Application Data

(60) Continuation-in-part of application No. 10/755,768, filed on Jan. 12, 2004, now Pat. No. 6,926,298, which is a division of application No. 10/424,329, filed on Apr. 28, 2003, now abandoned, which is a division of application No. 10/281,885, filed on Oct. 28, 2002, now Pat. No. 6,595,538, which is a division of application No. 10/073,482, filed on Feb. 11, 2002, now Pat. No. 6,471,230, which is a division of application No. 09/623,210, filed as application No. PCT/US99/04853 on Mar. 2, 1999, now Pat. No. 6,378,885.

(60) Provisional application No. 60/076,489, filed on Mar. 2, 1998.

(51) Int. Cl.
  *B62K 25/28* (2006.01)
(52) U.S. Cl. ........................ 280/284; 280/261
(58) Field of Classification Search ................ 280/283, 280/284, 259, 260, 261
  See application file for complete search history.

(56) References Cited

U.S. PATENT DOCUMENTS

| 494,803 | A | 4/1893 | Cable |
| 603,418 | A | 5/1898 | Adriance |
| 625,456 | A | 5/1899 | Mills et al. |
| 3,917,313 | A | 11/1975 | Smith et al. ................ 280/284 |

(Continued)

FOREIGN PATENT DOCUMENTS

EP 0 279 763 8/1988

(Continued)

OTHER PUBLICATIONS

Three pages from an Internet web site having a URL of http://www.dw-link.com. The pages were printed on Jan. 12, 2006 and have a copyright of 2005. Applicant is unaware of the author and publication date of the pages.

(Continued)

*Primary Examiner*—Kevin Hurley

(57) ABSTRACT

Bicycles are disclosed which include a rear wheel suspension system. The rear wheel suspension of the present bicycles are designed to move an instant center to track a chain torque line of the bicycle and generally improve performance of the bicycles. In certain embodiments, the rear wheel suspension system includes a shock absorber apparatus attached to the main frame of the bicycle. In additional embodiments, the shock absorber apparatus includes a bell crank or a rotary torsion spring. Embodiments are also described which include a gear box. Methods of improving bicycle performance by tracking a chain torque line with an instant center are also disclosed.

11 Claims, 8 Drawing Sheets

U.S. PATENT DOCUMENTS

| | | | | |
|---|---|---|---|---|
| 3,974,892 | A | 8/1976 | Bolger | 180/32 |
| 4,058,181 | A | 11/1977 | Buell | 180/32 |
| 4,505,492 | A | 3/1985 | Tsunoda | 280/284 |
| 4,789,174 | A | 12/1988 | Lawwill | 280/284 |
| 5,121,937 | A | 6/1992 | Lawwill | 280/284 |
| 5,217,241 | A | 6/1993 | Girvin | 280/284 |
| 5,244,224 | A | 9/1993 | Busby | 280/284 |
| 5,306,036 | A | 4/1994 | Busby | 280/284 |
| 5,354,085 | A | 10/1994 | Gally | 280/285 |
| 5,370,411 | A | 12/1994 | Takamiya et al. | 280/284 |
| 5,409,249 | A | 4/1995 | Busby | 280/284 |
| 5,441,292 | A | 8/1995 | Busby | 280/284 |
| 5,474,318 | A | 12/1995 | Castellano | 280/284 |
| 5,509,679 | A | 4/1996 | Leitner | 280/284 |
| 5,553,881 | A | 9/1996 | Klassen et al. | 280/284 |
| 5,628,524 | A | 5/1997 | Klassen et al. | 280/284 |
| 5,671,936 | A | 9/1997 | Turner | 280/284 |
| 5,678,837 | A | 10/1997 | Leitner | 280/284 |
| 5,957,473 | A | 9/1999 | Lawwill | 280/284 |
| 6,056,307 | A | 5/2000 | Busby et al. | 280/284 |
| 6,102,421 | A | 8/2000 | Lawwill | 280/284 |
| 6,161,858 | A | 12/2000 | Tseng | 280/281.1 |
| 6,199,886 | B1 | 3/2001 | Guenther | 280/284 |
| 6,206,397 | B1 | 3/2001 | Klassen et al. | 280/284 |
| 6,378,885 | B1 | 4/2002 | Ellsworth et al. | 280/284 |
| 6,471,230 | B2 | 10/2002 | Ellsworth et al. | 280/284 |
| 6,551,210 | B2 | 4/2003 | Miller | 475/189 |
| 6,595,538 | B2 | 7/2003 | Ellsworth et al. | 280/284 |
| 6,676,559 | B2 | 1/2004 | Miller | 476/38 |
| 6,689,012 | B2 | 2/2004 | Miller et al. | 476/37 |
| 6,926,298 | B2 | 8/2005 | Ellsworth et al. | 280/284 |
| 2005/0067806 | A1 | 3/2005 | Weagle | 280/124.1 |
| 2005/0067810 | A1 | 3/2005 | Weagle | 280/284 |
| 2005/0153809 | A1 | 7/2005 | Miller | 475/207 |

FOREIGN PATENT DOCUMENTS

| | | |
|---|---|---|
| FR | 2774966 | 8/2000 |

OTHER PUBLICATIONS

Two pages from an Internet web site having a URL of http://www.ironhorsebikes.com. The pages were printed on Jan. 18, 2006. Applicant is unaware of the author and publication date of the pages. A one page brochure from a bike shop advertising a VPP Outland frame. The advertisement appeared at p. 7 in a Summer 1998 catalog. Applicatns are unaware of any author for the brochure.

Five pages from an Internet web site having a URL of http://www.intensecycles.com. The pages were printed on Feb. 22, 1998.

Two pages from an Internet web site having a URL of http://www.gtbicycles.com. The pages were printed on Feb. 22, 1998.

Four pages from an Internet web site having a URL of http://www.mountaincycle.com. The pages were printed on Feb. 22, 1998.

Six pages from an Internet web site having a URL of http://www.schwinn.com. The pages were printed on Feb. 22, 1998.

Six pages from an Internet web site having a URL of http://www.ventapausa.com. The pages were printed on Feb. 22, 1998.

One page entitled "A Werewolf in Santa Ana" appearing in the Aug., 1997 issue of Mountain Bike. No author is indicated.

European Supplementary Search Report for related European Application No. EP 99 91 2285.

Document dated Sep. 2, 2005 for Case No. SACV05-855 AHS (MLGx). The document includes the Complaint for Damages and Injunctive Relief with Exhibits 1-5 for the above Case involving U.S. Pat. Nos. 6,378,885; 6,471,230; and 6,595,538 by the applicants of the present patent application. The patents involved in this case are related to the present patent application.

Document dated Sep. 2, 2005 for Case No. SACV05-855 AHS (MLGx). The document is entitled Summons In A Civil Case.

Document dated Oct. 17, 2005 for Case No. SACV05-855 AHS (MLGx). The document is entitled Notice of Stipulation to Extend Time for Defendent to File Its Responsive Pleading.

Document dated Nov. 17, 2005 for Case No. SACV05-855 AHS (MLGx). The document is entitled Order Striking Filed Documents From the Record.

Document dated Nov. 29, 2005 for Case No. SACV05-855 AHS (MLGx). The document is entitled Answer to Complaint, Affirmative Defensives, and Counterclaim.

Document dated Dec. 2, 2005 for Case No. SACV05-855 AHS (MLGx). The document is entitled Order to Parties Requiring Rule 26(f) Report to be Filed No Later Than Feb. 6, 2006.

Document dated Dec. 12, 2005 for Case No. SACV05-855 AHS (MLGx). The document is entitled Amended Answer to Complaint, Affirmative Defensives, and Counterclaim.

Document dated Jan. 4, 2006 for Case No. SACV05-855 AHS (MLGx). The document is entitled Reply of Anthony S. Ellsworth and Ellsworth Handcrafted Bicycles, Inc. to Groupe Procycle, Inc. d/b/a Rocky Mountain Bicycles' Amended Counterclaim.

Document dated Feb. 6, 2006 for Case No. SACV05-855 AHS (MLGx). The document is entitled Joint Rule 26(f) Report.

Document dated Jun. 13, 2006 for Case No. SACV05-855 AHS (MLGx). The document is entitled Civil Minutes—General.

Document dated Jun. 13, 2006 for Case No. SACV05-855 AHS (MLGx). The document is entitled Order for Jury Trial.

Document for Case No. SACV05-855 AHS (MLGx) entitled Notice of Assignment of United States Magistrate Judge for Discovery.

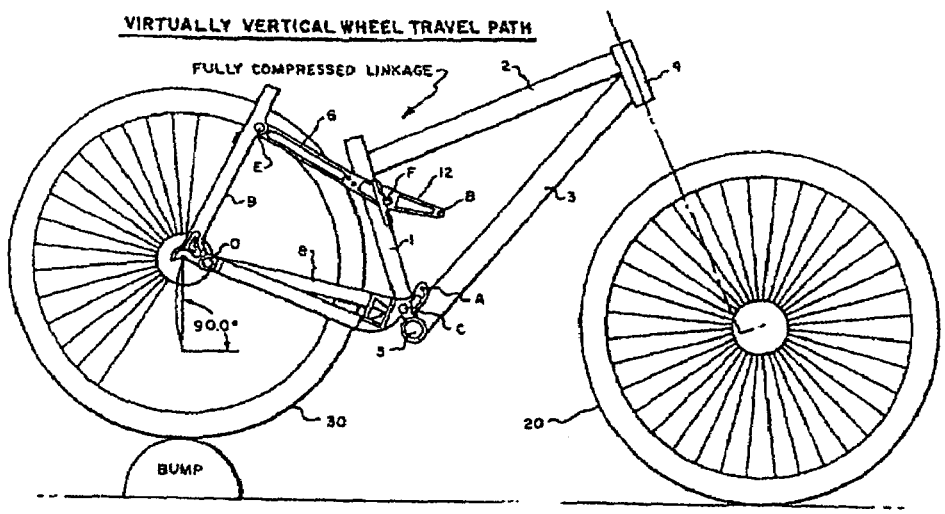
FIG. 12
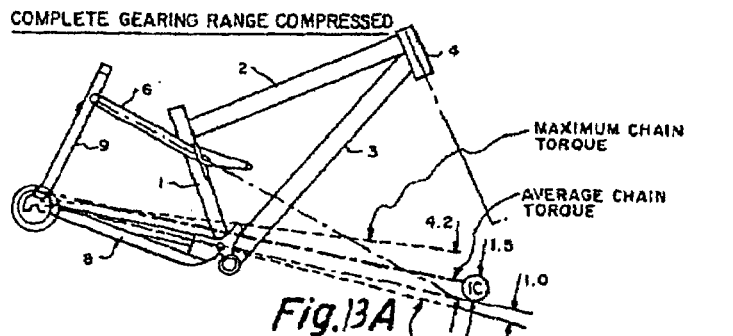
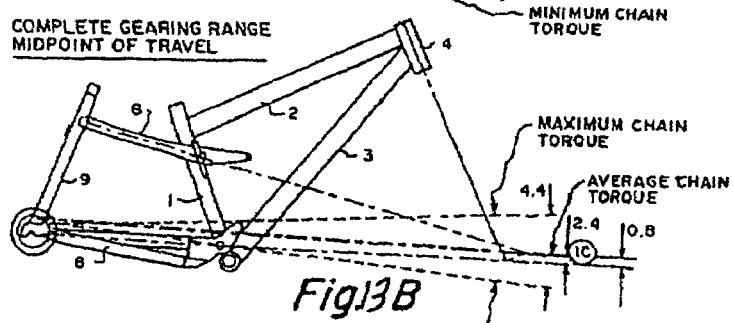
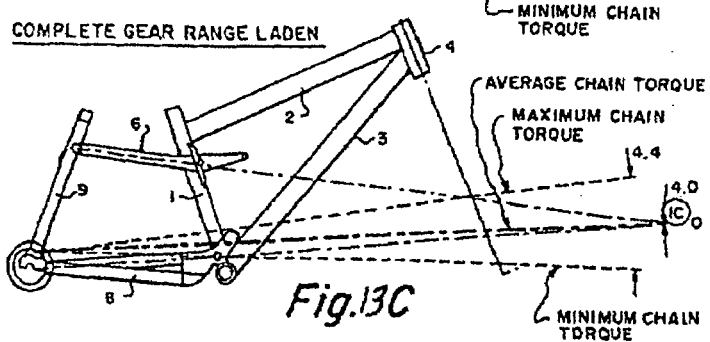

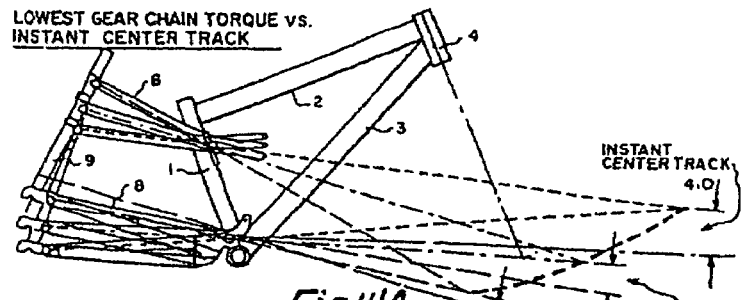
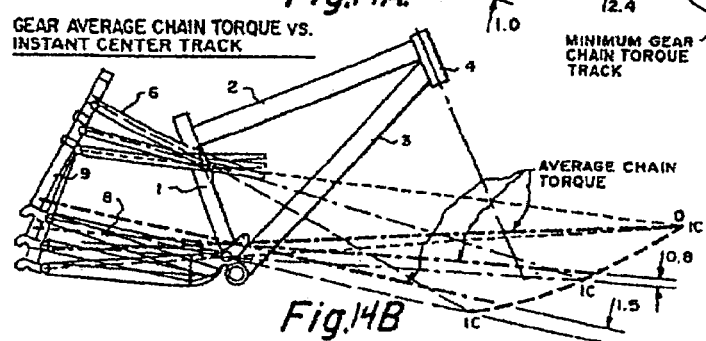
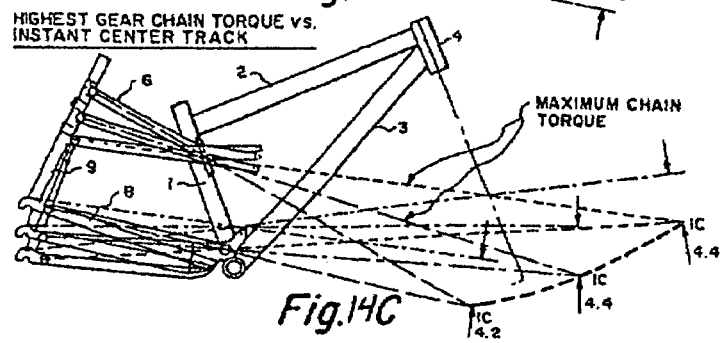
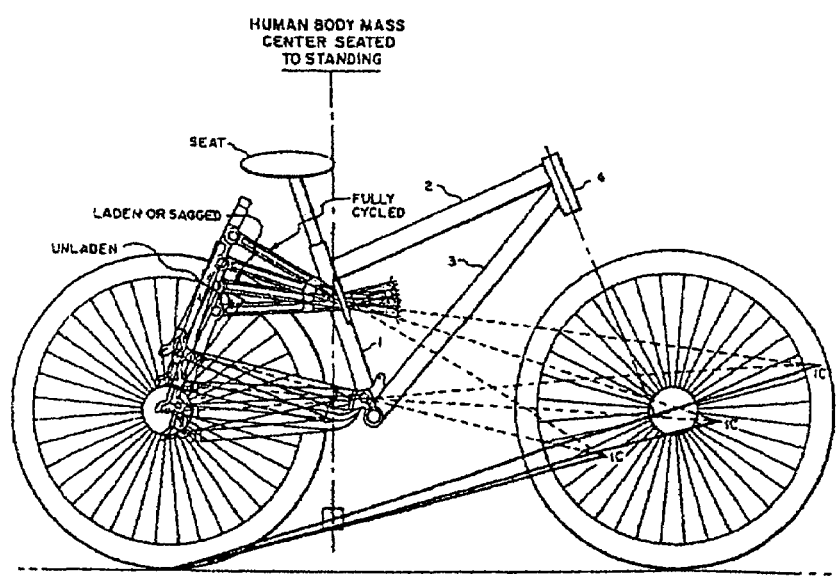
FIG. 15

FIG. 16A
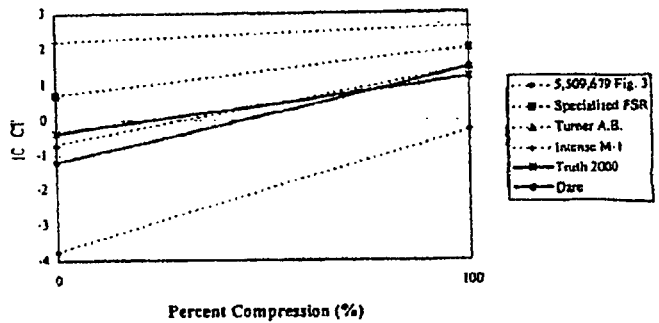
FIG. 16B
FIG. 17A
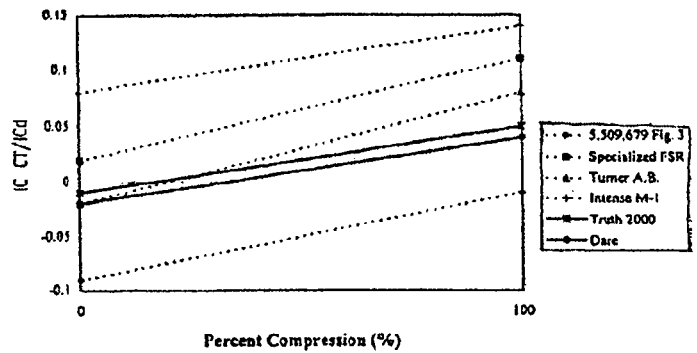
FIG. 17B

BICYCLE SUSPENSION APPARATUS AND RELATED METHOD

CROSS-REFERENCE TO RELATED APPLICATIONS:

This application is a continuation-in-part of U.S. application Ser. No. 10/755,768, filed Jan. 12, 2004 now U.S. Pat. No. 6,926,298, which is a divisional of U.S. application Ser. No. 10/424,329, filed Apr. 28, 2003, now abandoned, which is a divisional of U.S. application Ser. No. 10/281,885, filed Oct. 28, 2002, now U.S. Pat. No. 6,595,538, which is a divisional of U.S. application Ser. No. 10/073,482, filed Feb. 11, 2002, now U.S. Pat. No. 6,471,230, which is a divisional of U.S. application Ser. No. 09/623,210, filed Aug. 29, 2000, now U.S. Pat. No. 6,378,885, which was the National Stage of International Application No. PCT/US99/04853, filed Mar. 2, 1999, which claims the benefit of U.S. Provisional Application No. 60/076,489, filed Mar. 2, 1998, the contents of all of which in their entireties are hereby incorporated by reference.

BACKGROUND OF THE INVENTION

The present invention relates to bicycles, and in particular, bicycles that have a rear wheel suspension system, and related methods.

Bicycles, such as mountain bikes, that have rear wheel suspension systems often suffer from one or more problems associated with such rear wheel suspension systems. For example, some mountain bikes with rear wheel suspension systems suffer from pedal-induced bobbing, or pedal-induced compression and decompression of the rear wheel suspension system. Some mountain bikes also demonstrate brake-induced effects on the rear wheel suspension system. The compression and decompression of the rear wheel suspension system due to rider-induced actions, as opposed to ground induced actions, results in energy loss and decreased riding performance. Thus, there remains a need in the art for bicycles with improved rear wheel suspension systems that enhance or improve the riding performance of the bicycle.

SUMMARY

The present invention addresses this need, among others, and provides a bicycle, such as a mountain bike, that reduces and preferably eliminates pedal-induced bobbing or pedal-induced compression and decompression of a rear wheel suspension system of the bicycle while the bicycle is being ridden by a person or rider. The present rear wheel suspension systems attempt to reduce pedal-induced bobbing and improve performance of a bicycle by tracking a chain force torque line with an instant center. This tracking provides substantial improvements over existing rear wheel suspension systems of which the present inventors are aware. The chain force torque line is tracked by the instant center by configuring the rear wheel suspension system to move the instant center such that a perpendicular distance between the instant center and the chain force torque line is maintained as small as reasonably possible throughout the suspension system's range of compression.

As used herein, the instant center is defined as a point at the intersection of a first imaginary straight line drawn through rearward and forward pivot points of an upper rocker arm of the suspension system, and a second imaginary straight line drawn through rearward and forward pivot points of a lower rocker arm of the suspension system. As used herein, a chain torque line may be understood to be a parallel line extending along the tension side of a chain while the chain is positioned on a chain sprocket or chain sprockets of the bicycle. The chain force torque line is usually a parallel line extending along the upper portion of a chain when placed on conventional front and rear sprocket assemblies.

Unlike prior art rear wheel suspension systems, the present rear wheel suspension systems are configured so that the suspension systems have a measurable or calculatable instant center when the rear wheel suspension system is in a fully uncompressed configuration and in a fully compressed configuration. In addition, the present rear wheel suspension systems are configured to move the instant center so that the perpendicular distance between the instant center and a chain torque line decreases to zero as the suspension is compressed from a less compressed configuration, such as a fully uncompressed configuration, and as the suspension is decompressed or uncompressed from a more compressed configuration, such as a fully compressed configuration.

A bicycle in accordance with the present invention comprises a main frame and a rear wheel suspension system pivotably attached to the main frame. The rear wheel suspension system comprises an upper rocker arm and a lower rocker arm. Each of the rocker arms have rearward and forward pivot points. The rear wheel suspension is configured to track a chain torque line with an instant center, as described above.

In one embodiment, the main frame of the bicycle comprises a top tube, a down tube, and a seat tube, and the rear wheel suspension system comprises a shock absorber apparatus coupled to the main frame of the bicycle. As used herein, terms such as "coupled" or "attached" include both direct and indirect attachments. For example, a shock absorber apparatus that is coupled to the main frame may be directly attached to the main frame, or it may include one or more additional attachment components, such as brackets, extensions, recesses, and other structural features, to achieve the desired connection. By coupling the shock absorber apparatus to the main frame, improvements in design configuration can be obtained which may be useful in producing bicycles with smaller profiles and physical structures, which may also be effective in providing large wheel travel paths without substantial increases in shipping and manufacturing, for example.

In certain embodiments of the present bicycles and rear wheel suspension systems, the shock absorber apparatus comprises a bell crank, or a lever having two arms oriented to form an angle less than 180 degrees, for example between about 90 degrees and about 140 degrees. The bell crank of these embodiments may include a rod or "push rod" coupled to the bell crank and a portion of the rear wheel suspension system. The bell crank may be pivotably coupled to the rod and may also be pivotably coupled to a shock absorber. The shock absorber may be attached to the main frame by a mounting bracket located between the top tube and down tube of the main frame, or the shock absorber may be attached to the main frame by being attached at other locations of the main frame, such as the top tube, the down tube, or the seat tube for example.

In other embodiments of the present bicycles and rear wheel suspension systems, the shock absorber apparatus is provided as an integral component of the main frame or rear wheel suspension system. For example, the shock absorber apparatus may be provided in a housing effective in substantially surrounding the shock absorber apparatus. Providing a housing around the shock absorber apparatus may provide advantages of reduced contamination, by debris and the like, of the shock absorber apparatus. The housing is structured, such as sized and/or shaped, to enclose the shock absorber apparatus without interfering with the suspension actions of the suspension system, with the rider's pedaling performance, and/or other mechanical interactions of the bicycle. The housing may be small and located on one side of the seat tube of the bicycle, such as in front of or behind the seat tube. Or the housing may be relatively larger and straddle at least a portion of the seat tube, or be located on one side of the seat tube. The housing may be attached to the main frame of the bicycle near the bottom bracket used to house the pedal crank assembly. Although any suitable shock absorber apparatus may be used in embodiments including a housing, as described above, certain embodiments may employ a rotary torsion spring type shock absorber. The rotary torsion spring may be used on bicycles including the shock absorber apparatus housing, or may be used on bicycles without the housing.

In additional embodiments of the present bicycles, a housing may be provided which houses a gear assembly. For example, the present bicycles may comprise a gear box, which can be substituted for the derailleur system or systems of the bicycle. The housing can comprise a plurality of gears that are coupled to the crankshaft assembly of the bicycle so that pedaling of the pedals causes the gears in the housing to move. The gears in the gear box may permit a rider to shift gears without pedaling the pedals, which can provide some advantages over existing bicycles with derailleur systems. In certain embodiments, the gear box is provided as an integral part of the bicycle frame, such as by welding and the like, and may be located near the bottom bracket, or near the crank shaft assembly, of the bicycle. A gear box may also be provided near the rear wheel axle if desired.

It can be understood that the present bicycles may comprise one or more components located in a housing or housings. For example, a bicycle may comprise a shock absorber housing and a gear box or gear housing. Or, the shock absorber housing and the gear box can be formed as single portion of the bicycle frame.

The present invention also relates to methods of improving bicycle performance of bicycles that have a rear wheel suspension system. The methods comprise a step of tracking a chain force torque line with an instant center, as described herein.

Any feature or combination of features described herein are included within the scope of the present invention provided that the features included in any such combination are not mutually inconsistent as will be apparent from the context, this specification, and the knowledge of one of ordinary skill in the art. In addition, any feature or combination of features may be specifically excluded from any embodiment of the present invention. Additional advantages and aspects of the present invention are apparent in the following detailed description, drawings, and claims.

BRIEF DESCRIPTION OF THE DRAWINGS

FIG. 12 is a side elevation view similar to FIG. 1 and illustrating the nearly vertical wheel travel path achievable with the instant invention.

FIGS. 13A, 13B, and 13C are side elevation views of a bicycle with a rear wheel suspension system, and illustrating the "instant center" for a given amount of compression (13A illustrates full compression, 13B a mid-point of compression, and 13C a "laden" or rider-mounted compression), as well as the alignment of exemplary chain torque lines for various gear selections during the indicated amount of compression.

FIGS. 14A, 14B, and 14C are similar to FIGS: 13A-C, but instead each shows a single gear chain torque line (lowest gear, average gear, and highest gear) and illustrates how the instant center moves with respect to each of those lines during compression of the suspension from a laden, to a midpoint, to a fully compressed state.

FIG. 15 is a side elevation view similar to FIG. 1 and illustrating some of the anti-squat characteristics of the preferred embodiment;

FIGS. 16A and 16B illustrate a graph and a related table of data depicting the relationship of the difference between the instant center (IC) and the chain torque line (CT) versus the percentage compression of the suspension system.

FIGS. 17A and 17B illustrate a graph and a related table of data depicting the relationship of the ratio of the difference between the instant center (IC) and the chain torque line (CT), and the distance from the midpoint of a line between the upper and lower two rearward pivots to the instant center (ICd) versus the percent compression of the suspension system.

DETAILED DESCRIPTION

Figure 1:
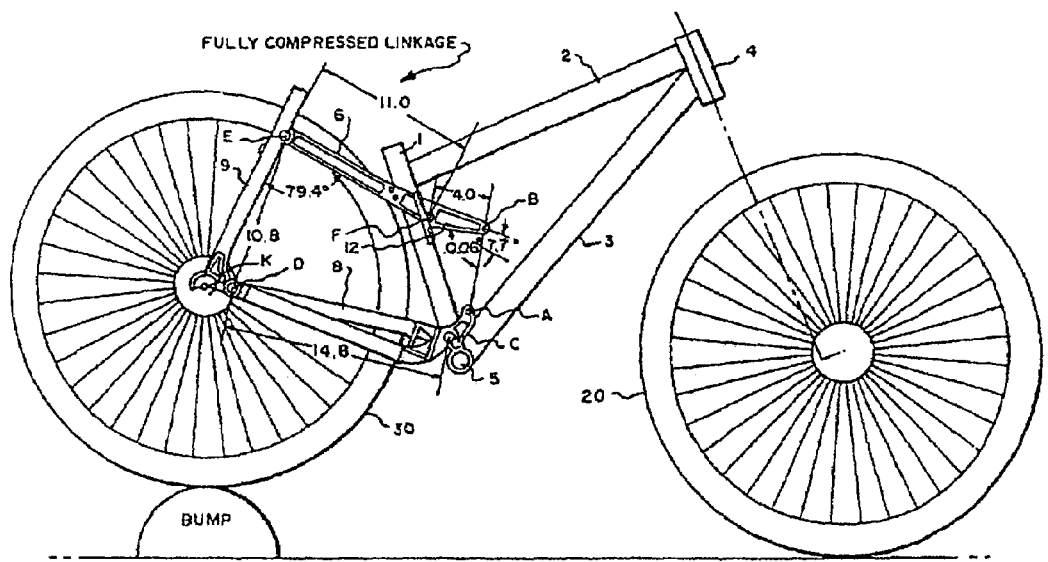
FIG. 1 is a side elevation view of a bicycle which comprises a rear wheel suspension system that tracks a chain torque line with an instant center.

Bicycles in accordance with the present invention include or comprise a rear wheel suspension system, among other things, that provide important and desirable benefits over currently existing bicycles and suspension systems. The rear wheel suspension systems of the present bicycles are structured so that a rear wheel suspension system of a bicycle tracks a chain torque line with an instant center. In other words, the rear wheel suspension system of a bicycle moves the instant center as the suspension system is compressed and decompressed. In particular, the rear wheel suspension system is structured so that the instant center tracks a chain torque line as the suspension system is compressed and decompressed to reduce bobbing actions of the bicycle, for example, pedal induced bobbing of the bicycle and to improve performance, such as riding performance, of the bicycle relative to other existing bicycles that do not track a chain torque line with an instant center.

The various components of the present bicycles, including the rear wheel suspension, may be fabricated using conventional materials and methods known to persons of ordinary skill in the art. For example, bicycles, including the rear wheel suspension systems, may be made from strong, lightweight materials, such as anodized aluminum and the like. The specific design configurations of the rear wheel suspension system and the bicycle in general can be initially prepared using computer aided drafting software, and then the appropriate components can be machined using conventional methods known to persons of ordinary skill in the art.

Reference will now be made in detail to the present bicycles, examples of which are illustrated in the accompanying drawings. Wherever possible, the same or similar reference numbers are used in the drawings and the description to refer to the same or like parts. It should be noted that the drawings are in simplified form and are not to precise scale. In reference to the disclosure herein, for purposes of convenience and clarity only, directional terms, such as, top, bottom, left, right, up, down, over, above, below, beneath, rear, front, backward and forward, are used with respect to the accompanying drawings. Such directional terms should not be construed to limit the scope of the invention in any manner.

Although the disclosure herein refers to certain illustrated embodiments, it is to be understood that these embodiments are presented by way of example and not by way of limitation. The intent of the following detailed description, although discussing exemplary embodiments, is to be construed to cover all modifications, alternatives, and equivalents of the embodiments as may fall within the spirit and scope of the invention as defined by the appended claims.

As shown in FIG. 1, a bicycle comprises a seat tube 1, a top tube 2, a down tube 3, a head tube 4, and a bottom bracket 5. These components of the bicycle are fixedly secured together, for example by welding, to define a main frame of the bicycle. Although the main frame of the bicycle illustrated in FIG. 1 is substantially triangular, additional bicycles of the present invention may comprise main frames with shapes other than triangular. For example, a main frame of a bicycle may be a Y-shaped frame. In these other bicycles, the seat tube may be understood to be a tubular device structured to maintain a bicycle seat in a fixed position, but not extending to the bottom bracket of the bicycle. The bicycle also comprises a front wheel 20 and a rear wheel 30. The rear wheel 30 is coupled to the main frame of the bicycle by the rear wheel suspension system, as discussed herein.

As shown in FIG. 1, the rear wheel suspension system comprises an upper rocker arm 6, a lower rocker arm assembly 8, and a shockstay or seatstay assembly 9. The upper rocker arm 6 and the upper rocker arm 7 (see FIG. 4) define an upper rocker arm assembly. The upper rocker arm 7 is located directly behind the illustrated rocker arm 6 of FIG. 1. For purposes of convenience, these components may also be referred to as an upper rocker arm, a lower rocker arm, and a shockstay, respectively. In the illustrated embodiment of FIG. 1, the upper rocker arm 6 and the lower rocker arm 8 are substantially the same length.

The rear wheel suspension system of the bicycle shown in FIG. 1 comprises a plurality of pivot points. For example, the rear wheel suspension system comprises a pivot point A located near the forward end of the lower rocker arm 8, a pivot point B located near the forward end of the upper rocker arm 6, a pivot point C located near the forward end of the lower rocker arm 8, a pivot point D located near the rearward end of the lower rocker arm 8, a pivot point E located near the rearward end of the upper rocker arm 6, and a pivot point F located near the forward end of the upper rocker arm 6. The rear wheel suspension system also includes rear wheel attachment receptacle shown encompassing a rear wheel axle K, which in the illustrated embodiment, is provided as a component of the shockstay 9. The lower rocker arm 8 is pivotably attached to the main frame at point C near the top of the bottom bracket 5. The shockstay or seatstay 9, or rear wheel attachment assembly, retains the rear wheel 30 rotatably mounted on a wheel axle K. The shockstay 9 is pivotably attached to the rearward end of the lower rocker arm 8 at pivot point D, and is pivotably attached to the upper rocker arm 6 at pivot point E.

As shown in the embodiment illustrated in FIG. 1, forward pivot point C is rearwardly positioned relative to pivot point A. Likewise, forward pivot point F is rearwardly positioned to pivot point B. In addition, pivot point C is illustrated as being located above bottom bracket 5, and pivot point F is located in proximity to the seat tube 1. The upper rocker arm is pivotably coupled to the seat tube 1 at pivot point F.

Figure 2:
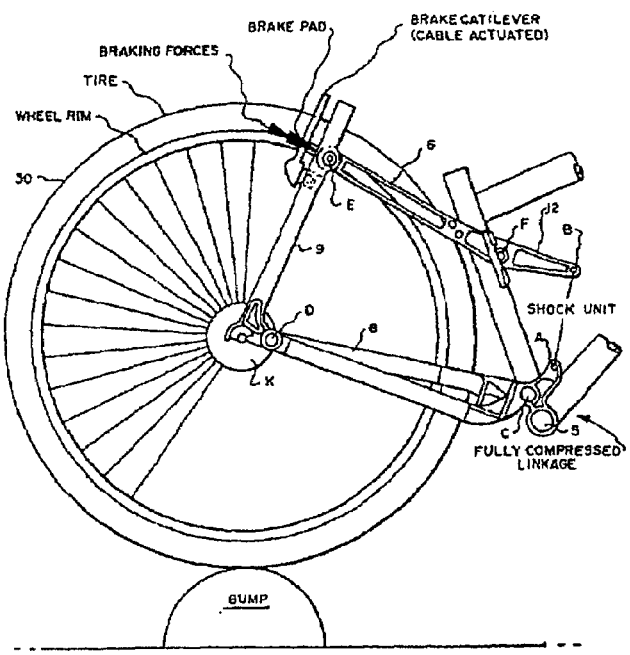
FIG. 2 is a partial, enlarged, broken side elevation view of a rear wheel suspension system of the a bicycle similar to FIG. 1.

The bicycle illustrated in FIG. 1 is illustrated without a seat, without handlebars or a fork, and without a specific shock absorption element or apparatus for clarity. As shown in FIG. 2, the words "shock unit" indicate one location of a shock absorption element for the illustrated bicycle. As shown in FIG. 2, the shock absorption element or shock absorbing apparatus is coupled to the upper rocker arm 6 at point B, and the lower rocker arm 8 at point A. In the illustrated system of FIG. 1 and FIG. 2, the shock absorbing device is pivotably coupled at points A and B.

The shock absorber of the present rear wheel suspension systems and bicycles may be either pull or push shocks, as understood by persons of ordinary skill in the art. For example, the shock absorber may comprise any suitable shock absorbing construction, such as a wire coil, elastomer, air or other medium, such as spring with an oil, air or other medium damper, or any other suitable expedient. Shock absorber devices that may be utilized with the present bicycles may be obtained commercially from companies, such as Fox Racing Shox (California).

Figure 18:
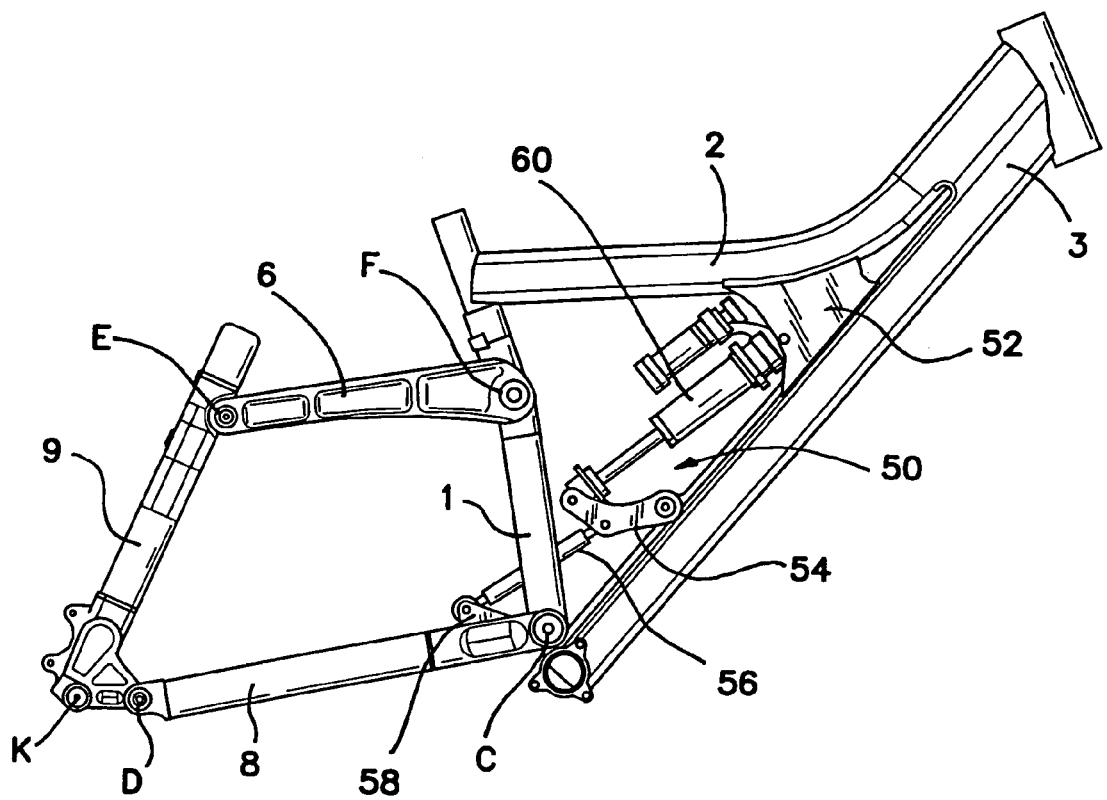
FIG. 18 is a side elevation view similar to FIG. 1 illustrating a suspension system of a bicycle which uses a bell crank actuated shock absorbing apparatus.

The shock absorber assembly or shock absorber can be attached to the bicycle and rear wheel suspension system in a wide variety of locations and orientations. By way of example and not by way of limitation, the shock absorber can be attached behind the seat, connected between the shockstay and rocker arms, or attached to the downtube or other components of the main frame. Thus, the shock absorber can be attached to the components of the rear wheel suspension system and/or can be attached to the main frame of the bicycle. In addition, as discussed above, the shock absorber apparatus can provide shock absorption in a variety of manners, for example by using "push" shock absorbers or "pull" shock absorbers, rotary torsion springs, or combinations thereof. One embodiment of a bicycle with a shock absorber that is attached to the main frame is shown in FIG. 18, as discussed herein.

FIG. 1 also illustrates some dimensions (inches) and angles (degrees) for the components of the rear wheel suspension system in a fully compressed position. These dimensions and angles are provided for purposes of illustration only, and in additional embodiments of the present bicycles and rear wheel suspension systems, the dimensions and angles may differ from those illustrated in FIG. 1. The relative dimensions, shapes, and attachment points of the components of the rear suspension system are among the factors that determine the angle of the upper rocker arm assembly 6 with respect to the lower rocker arm 8.

FIG. 2 illustrates an enlarged view of the rear wheel suspension system of the bicycle shown in FIG. 1. The bicycle shown in FIG. 2 comprises a brake assembly that is configured or positioned on the bicycle to reduce or isolate brake torque caused by braking forces. When caliper brakes of a bicycle squeeze the rim of a rear wheel, a torque is created at the compression point which is then transferred into the frame at the connection points of the member on which the brakes are mounted (for example, the shockstay 9) to the lower and/or upper rocker arms (such as rocker arms 6 and 8). If that force is aligned at a 90 degree angle, then there is no torque, and that force has no impact on the compression or extension of the suspension. Any deviation from 90 degrees creates a torque moment that will pull or push the rocker arms or swingarms up or down-resulting in compression or extension of the suspension system. Such compression can make the suspension too stiff so that it won't properly absorb bumps, or can even cause the tire to break loose from the ground and lose traction. If the moment causes the suspension to extend, that extension tends to lift the back of the bike, shifting the rider and weight forward and tending to "catapult" the rider over the handlebar and off the bike. None of these effects is conducive to good control of the bike.

In the illustrated embodiment, the brake assembly is a cantilever, cable-actuated brake attached to the shockstay 9. Although a conventional cantilever brake is illustrated, other brake assemblies, including disk brakes and the like can be utilized with the present rear wheel suspension systems and still provide brake torque isolation, if desired. Thus, the present bicycles comprise a rear wheel suspension system which cooperates with a brake assembly to effectively reduce or isolate brake torque. This may be understood to be "brake torque isolation" of the present rear wheel suspension systems. The brake torque isolation provided on the present bicycles can be achieved by the attachment and alignment of pivot points D and E of the shockstay 9 relative to the mounting of the brake on the rear wheel.

As shown in FIG. 2, the brake calipers of the bicycle are mounted nearly perpendicular to a line drawn between the rear lower link pivot D and the rear rocker pivot E. This perpendicular relationship helps prevent the suspension from responding to the torque of an applied brake mounted on the shockstay 9.

Figure 3:
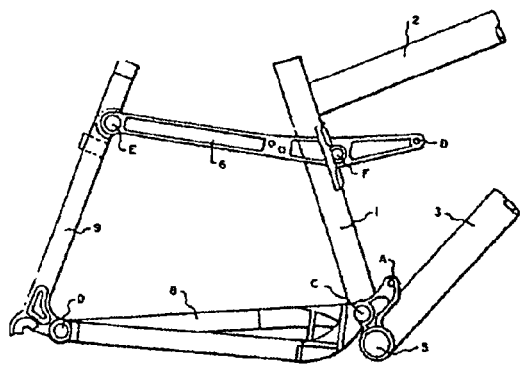
FIG. 3 is a partial, enlarged, broken side elevation view similar to FIG. 1 showing the rear wheel suspension system without a tire.
Figure 4:
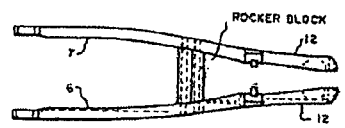
FIG. 4 is a top view of the upper swingarm assembly or rocker arms of FIG. 3.
Figure 5:
FIG. 5 is a side elevation view of the upper swingarm assembly of FIG. 4.
Figure 6:
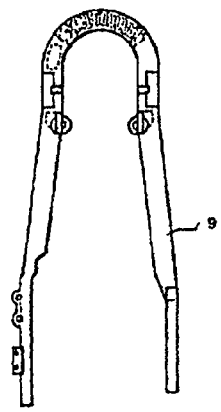
FIG. 6 is a plan view of the shockstay assembly of FIG. 3.
Figure 7:
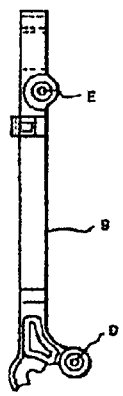
FIG. 7 is a side view of the shockstay assembly of FIG. 6.
Figure 8:
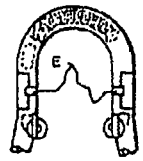
FIG. 8 is an enlarged plan view of the top portion of the shockstay assembly of FIG. 6.
Figure 9:
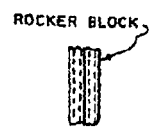
FIG. 9 is a top view isolating the spacer clevis element or "reinforcement block" or "rocker block" of FIG. 4
Figure 10:
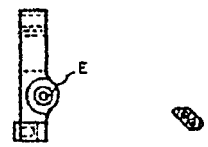
FIG. 10 is a side view of the shockstay assembly of FIG. 8.
Figure 11:
FIG. 11 is a sectional view of the "rocker block" of FIG. 4.

FIGS. 3-11 illustrate various components of the rear wheel suspension system of the present bicycles. As shown in FIG. 3, the rear wheel suspension system comprises an upper rocker arm 6, a lower rocker arm assembly 8, and a shockstay assembly 9. The upper rocker arm 6 is illustrated as being pivotably attached to the seat tube 1 at pivot point F, and pivotably attached to the upper portion of the shockstay 9 at pivot point E. The lower rocker arm 8 is illustrated as being pivotably attached near the bottom bracket 5 at pivot point C, and to the lower portion of the shockstay 9 at pivot point D. The upper rocker arm assembly is shown as comprising two individual upper rocker arms 6 and 7, as shown in FIG. 4. A side view of the upper rocker arm 6 is shown in FIG. 5. A rocker block is located between the rocker arms 6 and 7, and is illustrated in FIG. 9. FIG. 6 shows a rear plan view of the shock stay 9 of the rear wheel suspension system. FIG. 7 is a side view of the shockstay 9. FIG. 8 shows a portion of the top of the shockstay 9. FIG. 10 illustrates a side view of the portion of FIG. 8. FIG. 11 shows a sectional view of the rocker block of FIG. 9.

In addition, and as discussed herein, the rear wheel suspension systems of the present bicycles attempt to provide nearly vertical rear wheel movement as the suspension system is compressed and decompressed or uncompressed, as shown in FIG. 12. Less vertical rear wheel travel generally corresponds to reduced efficiency and performance, such as when absorbing bumps, and/or pulling the bike and rider unnecessarily back toward the bump. Vertical wheel movement becomes very noticeable as greater compression of wheel "travel" is permitted within the suspension system.

As shown in FIGS. 13A, 13B, and 13C, and 14A, 14B, and 14C, and FIG. 15, imaginary straight lines drawn (1) along the lengthwise axis of upper rocker arm 6 and (2) along the lengthwise axis of the lower rocker arm 8 converge on an imaginary forward point in space. As described herein, that point is called an "instant center", labeled "IC" in the drawings. Thus, the instant center may be understood to be a point at the intersection of a first imaginary straight line drawn through rearward and forward pivot points of an upper rocker arm of the suspension system, and a second imaginary straight line drawn through rearward and forward pivot points of a lower rocker arm of the suspension system. In reference to the figures, the instant center is a point at the intersection of a first straight line drawn through pivot points E and F of the upper rocker arm assembly, and a second straight line drawn through pivot points D and C of the lower rocker arm assembly.

As shown in the figures, the instant center is located in front of the forward pivot points, such as pivot points F and C, of the upper and lower rocker arms, respectively. In particular, the instant center is located in front of the forward pivot points when the suspension is not compressed. As shown in the figures, the instant center may be located in front of the bottom bracket. In certain embodiments, including the illustrated embodiments, the instant center is located in front of the front wheel axle of the bicycle when the bicycle is not compressed. In at least one embodiment, the instant center is located in front of the front wheel axle and above a horizontal line passing through the front wheel axle when the bicycle is not compressed. In other embodiments, the instant center may be located in front of the forward pivot points described above, but may be located behind or rearward to the front wheel axle of the bicycle.

As the rider load and shock loads vary while a bicycle is being ridden, the rear suspension's upper rocker arm assembly and lower rocker arm assembly (and consequently the rear wheel 30) pivot radially about this "instant center". The precise position of the instant center at any given moment in time depends on a number of factors, including (by way of example) the location of the pivot points C, D, E, and F, the length of the upper rocker arms and lower rocker arms, and the amount of compression of the shock absorber.

The present bicycles comprise a rear wheel suspension system that tracks a chain torque line by moving the instant center as the rear wheel suspension system compresses and decompresses. As used herein, a chain torque line may be understood to be a parallel line extending along the tension side of a chain while the chain is positioned on a chain sprocket of the bicycle. The chain torque line typically refers to the position of the chain on particular sprocket combinations. In certain embodiments of the present bicycles, the instant center tracks an average chain torque line, or the average of chain torque lines on different sprocket combinations.

"Tracking" of the chain torque line refers to the ability of the rear wheel suspension system to move the instant center towards the chain torque line as the suspension is compressed and decompressed, as shown in FIG. 16A, and as discussed herein. The instant center moves so that a perpendicular distance between the instant center and the chain torque line decreases to zero as the suspension is compressed from a less compressed configuration. In addition, the instant center moves so that a perpendicular distance between the instant center and the chain torque line decreases to zero as the suspension is uncompressed from a more compressed configuration. When the perpendicular distance between the instant center and the chain torque line equals zero, the instant center is aligned with the chain torque line. Stated differently, tracking of a chain torque line with an instant center may be understood to be accomplished by moving the instant center so that the perpendicular distance between the chain torque line and the instant center approaches zero as the suspension system is decompressed from a fully compressed configuration, and as the system is compressed from a fully uncompressed configuration.

As described above, the "instant center" may be located exactly on the average chain torque line when the rear wheel suspension is in laden condition (as indicated elsewhere herein, "laden" condition is the normal operating position of the suspension linkage as set up by the individual rider or refers to the condition when the rider is located on bicycle). Chain-induced torque reaction is reduced, and preferably eliminated, any time the suspension's instant center is aligned with the drive-chain line or chain torque line. The illustrated embodiment results in the desired alignment of the instant center in the laden condition and maintains the instant center in a position held close to the chain torque line in all gear positions and suspension positions (rider load, shock load, etc.). Thus, for any compression position of the suspension system, the instant center always falls between the maximum and minimum chain force torque lines. Among other things, this results from the suspension linkage arms being nearly equal in length and going through nearly identical arcs as the rear suspension goes through its stroke, as compared to the typical prior art designs of short upper and longer lower linkage arms. This geometry helps keep the instant center from shifting lower in relationship to the chain torque line as the suspension compresses (which shifting is typical in certain prior art designs, for those prior art designs that even have an instant center at any time).

Referring back to the figures, the pivot points C, D, E, and F are positioned so that the instant center very closely approaches or (in certain conditions, such as in the laden condition) coincides or is aligned with the driving axis of the drive chain or a chain torque line (shown as various lines in FIGS. 13A-C and 14A-C). Arrows and dimensions in FIGS. 13A-C and 14A-C illustrate the perpendicular "moment arm" for different compression states of the rear wheel suspension system. When the instant center exactly coincides with a chain torque line, or when the instant center is aligned with the chain torque line, there is no moment arm and therefore no chain drive torque to "suck" the rider's energy or decrease bicycle performance. This is illustrated, for example, in the laden condition of the bicycles, in FIGS. 13C and 14B, which both show that condition for the average chain torque line.

This "no-torque" condition is also illustrated in FIGS. 13A and 13B, whereby at any point of compression travel for the suspension system, a gear between the maximum and minimum gear should be selectable to either "hit" or align with the instant cent or get very near to it in both FIGS. 13A and 13B, a gear between the "average" and the "minimum" gear would approach or align with the instant center. Another embodiment of the present bicycles can be structured so that in compressed conditions the suspension system would instead align with the instant center by selecting a gear between the average and the maximum gear chain torque lines. Indeed, the present bicycles permit the instant center tracking and related performance parameters to be controlled very precisely. In such situations, substantial amounts or all of that energy that would have been "sucked" into torque can instead be channeled or converted into force moving the bicycle and rider forward (up or down the mountain, for example).

Even when the chain torque line does not precisely intersect the IC (and there is therefore some torque-induced loading), that loading is greatly reduced when compared to current art suspension devices and constructions. Said another way, because of the close proximity to the chain torque line in all gear combinations, if the torque were to effect the linkage, it would have a shorter distance to move the suspension apparatus in order to align the instant center with the chain torque line, thus reducing and preferably eliminating any power loss.

Also, in the maximum compression position (see FIG. 1, for example), the substantially perpendicular relationship between the shock absorber axis and the rocker nose 12 provides a desirable linearly progressive shock suspension ratio while still isolating pedal and brake forces (eliminating energy-absorbing torque loads). Persons of ordinary skill in the art will understand that the "nose" of the upper rocker arm 6 can be of a variety of shapes, dimensions, and configurations, and that the particular selection of the nose design will (among other things) "program" the shock motion ratio behavior of the frame.

The precise range of movement of the instant center can be selected by varying locations of pivot points C, D, E, and F (by, for example, varying the relative size and shape of the components of the linkage), but the preferred embodiments of the present bicycles keep the instant center as close as possible to the chain torque line during the greatest range of loading conditions while maintaining correct geometry for brake torque isolation and anti-squat and keeping the packaging (design) conducive to using industry standard components, adaptability to a broad range of frame sizes, and a structurally light yet sound complete frame assembly, as discussed herein.

In the embodiment of the bicycle illustrated in FIG. 1, when the instant center and chain torque line intersect, no drive chain-induced torque moment can affect, by compression or extension, the suspension's shock absorber. By having the instant center aligned with the chain torque line on the drive or tensioned side, the cranks pulling on the chain during pedaling have no off center leverage or moment arm to lift or compress the suspension. Due to the instant center's positioning in relationship with the bicycle/rider centroid of mass distribution, the rear suspension resists wheel-induced drive torque moments that can also move the suspension. The arrangement of the components of the rear wheel suspension system minimizes suspension-induced pedaling power losses caused by the drive chain moment-induced suspension movement. This loss is a primary loss of power transference efficiency in a bicycle with rear suspension.

The rear wheel suspension system of the present bicycles can also be structured to counteract effects of torque moments being transferred to the shock absorber. These suspension systems may be understood to include "anti-squat" design elements. As illustrated in FIG. 15, this percentage may be calculated by drawing an imaginary line through the center of the rear wheel tire contact patch and the "instant center". Another imaginary line is drawn through the bicycle and rider unit combination's center of gravity, perpendicularly to the ground plane. The point where this line intersects the imaginary line from the rear wheel tire's contact patch to the instant center is called the "anti-squat calculation point". The height distance in units of measure of the "anti-squat" calculation point to the ground is divided by the height distance in units of measure from the ground to the bicycle and rider unit combination's center of gravity. This number gives the percentage of "squat resistance" built into the rear suspension's geometry, where 100 percent equals full cancellation and zero percent is no cancellation.

The instant center of the present bicycles tracks the chain torque line very closely, always within the range of gears and very near the average, most commonly used gears of the gear range, insuring minimal torque reaction, regardless of the suspension's location in stroke. The range of gear positions where the suspension is or is almost non-pedal-torque-reactive is very large, far larger than any current production bicycle, and/or the percentage of deviation (through the entire compression stroke, laden to fully compressed, etc.) from complete torque cancellation is smaller than that of any current production bicycle.

The present bicycles' ability of the chain torque line to be tracked by the instant center is illustrated in the graphs and data of FIGS. 16A, 16B, 17A, and 17B. In FIGS. 16A and 16B, the difference between the instant center (IC) and the chain torque line (CT) is plotted as a function of the percentage of compression of the suspension system. When the instant center tracks the chain torque line perfectly, the difference between the instant center and chain torque line is equal to zero. At this point, as discussed herein, the instant center is aligned with the chain torque line. As is evident in FIGS. 16A and 16B, the instant center of one preferred embodiment of the invention (such as the Truth 2000 model) tracks the chain line perfectly when the suspension is approximately twenty to thirty-five percent compressed (i.e. the difference between the instant center and the chain line is zero when the suspension is approximately twenty to thirty-five percent compressed, or when it is in its normally laden position). Furthermore, the maximum deviation of the instant center from the chain torque line is low, indicating that the suspension system of the present bicycles "tracks" the chain torque line more accurately than any other suspension system of which the applicants are aware. In fact, the perpendicular distance difference between the instant center and the chain torque line for certain of the present bicycles is less than 0.66 inches in the "uncompressed" state and is less than 1.46 inches in the "fully compressed" state. Accordingly, the suspension system permits tracking between the instant center and the chain torque line of less than 1.46 inches throughout the suspension's entire compression range.

As can also be appreciated from FIGS. 16A and 16B, the majority of the bikes of which the inventors are aware never perfectly align the instant center with the chain torque line. This is fully appreciated by most of the bikes yielding values that remain above or below the zero axis throughout their entire compression ranges. Thus, since these bicycles do not reduce the perpendicular distance between the instant center and a chain torque line as the suspension system is compressed from an uncompressed state and as the suspension system is uncompressed from a compressed state, these bicycles do not track a chain torque line. When the value of the IC-CT is negative on the graph, the energy of the rider is wasted, as the resulting forces push the rider's weight up rather than forward with each pedal stroke. When the value of the IC-CT is positive, the forces tend to feed the chain torque into the shock absorber dissipating energy, that would have propelled the bike/rider unit forward, into heat.

FIGS. 17A and 17B illustrates the relationship of the ratio of the difference between the instant center (IC) and the chain torque line (CT), and the distance from the midpoint of a line between the upper and lower two rearward pivots to the instant center (ICd) versus the percent compression of the suspension system. As can be appreciated, at least one preferred embodiment of the present bicycles (e.g. the Dare model) keeps the aforementioned ratio closer to zero than any other bicycle throughout the entire compression. In particular, the aforementioned ratio is less than 0.08 throughout the entire compression range. This results in the maintenance of consistent anti-squat programming in the linkage system, as discussed above.

Suspension action of the present bicycles is unaffected by pedal force input. The suspension of the present bicycles is almost completely non-brake-torque reactive under most suspension load conditions. The mildly progressive, near-linear shock motion ratio provided by the invention works well with a wide range of shock absorbing elements, such as coil spring and air spring type shock absorbers. The invention's near-constant wheelbase dimension insures positive shifting and eliminates suspension-induced pedal kickback. The near-vertical wheel path (during shock absorption) insures efficient shock absorption and reduces forward drive energy losses.

Another embodiment of the present bicycles is illustrated in FIG. 18. The bicycle illustrated in FIG. 18 comprises a main frame formed by a seat tube 1, a top tube 2, and a down tube 3, similar to the other embodiments described herein. As shown in FIG. 18, the rear wheel suspension system includes an upper rocker arm 6, a lower rocker arm 8, and a shockstay or seatstay 9. The upper rocker arm and the lower rocker arm are pivotably attached to the main frame at pivot points F and C, respectively.

The embodiment illustrated in FIG. 18 includes a shock absorber apparatus 50 attached to a mounting bracket 52 and a bell crank linkage device 54. The bell crank linkage device 54 may be understood to be a lever having two ends and a central portion therebetween. The lever includes a pivot point at each end, and a pivot point located at the central portion. In the illustrated embodiment, the lever is attached to the down tube 3 at a pivot point on a first end of the lever, and is attached to the shock absorber 60 at the second end of the lever. The bell crank device 54 is actuated by a push rod 56 that is connected to the central portion of the lever. The push rod 56 is coupled to the suspension system by pivoting member 58. In the illustrated embodiment, the pivoting member 58 is coupled to the lower rocker arm 8 near the pivot point C. The push rod 56 may be extendable, retractable, or fixed. In other words, the length of the push rod 56 may change depending on the particular structure employed for the push rod.

Stated differently, the bicycle illustrated in FIG. 18 includes a bell crank actuated shock absorber apparatus. The bell crank may be understood to be an angled lever having a first end and a second end. The angle of the lever may be about 90° or more, for example, at an angle from about 90° to about 140°. The first end of the lever includes a first pivot point that provides pivotal attachment to the down tube 3 of the bicycle. The second end of the lever includes a second pivot point that provides pivotal attachment to the shock absorber device. A third pivot point is provided between the first end and the second end and provides a pivotal attachment to an end of the push rod 56.

Figure 19:
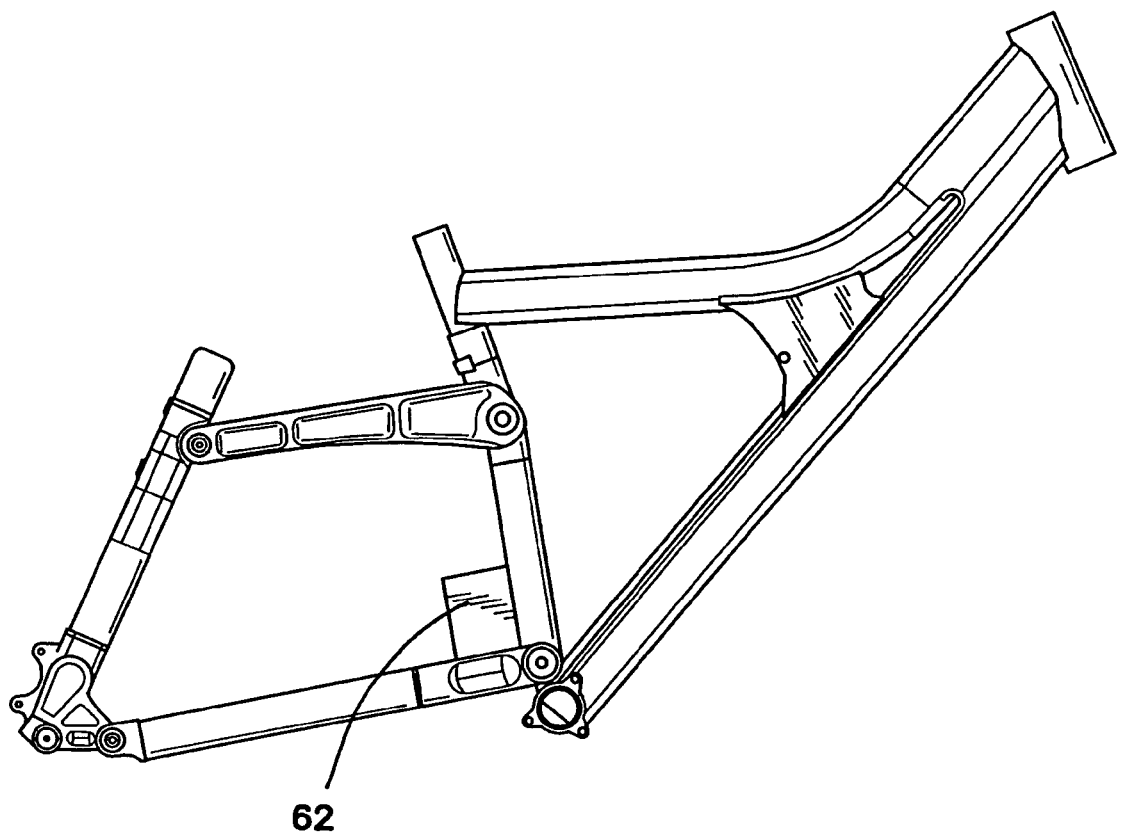
FIG. 19 is a side elevation view similar to FIG. 18 illustrating a suspension system of a bicycle which has a shock absorbing apparatus located in a housing.

As shown in FIG. 19, the present bicycles may include a shock absorber housing 62. The housing can have any appropriate size and/or shape, and may be structured to encase the entire shock absorber apparatus or one or more portions thereof (e.g., less than the entire shock absorber). The housing 62 is structured so that the housing does not negatively impact rider or bicycle performance. For example, the housing 62 does not interfere with the compression or decompression of the suspension system, does not interfere with pedaling of the bicycle, and does not interfere with breaking of the bicycle. The housing 62 may be located on one side of the seat tube, such as behind or in front of the seat tube, or the housing may straddle the seat tube so that a portion of the housing is behind the seat tube and a portion is in front of the seat tube. In FIG. 19, the housing 62 is located to the rear of the seat tube. When small housings are used, preferably, the shock absorber apparatus is similarly small. Thus, the shock absorber apparatus housed by the housing 62 in FIG. 19 may be a rotary torsion spring type of shock absorber. The housing 62 is mounted near the bottom bracket of the bicycle. In certain embodiments, the housing 62 is integrally attached to the main frame at or near the bottom bracket and in proximity to the lower rocker arm of the suspension system. For example, the housing 62 may be welded to the main frame at one or more locations to provide a secure attachment thereto.

In certain embodiments, the housing 62 extends from the bottom bracket and provides an integral casing structured to contain a major portion of the shock absorber apparatus. Although the housing contains a major portion of the shock absorber, it is to be understood that the housing may have one or more ports or openings structured to permit the shock absorber apparatus to be coupled to the suspension system and the main frame to provide the desired shock absorbing capabilities. For example, the housing may have openings on opposite sidewalls, each of the openings sized to accommodate a shock absorber connection element so that the shock absorber can perform its intended function. In embodiments in which the housing extends between the main frame to the suspension system, the housing may include a hinged portion. The hinged portion is effective to permit the rear portion of the housing to move as the suspension system is compressed and uncompressed. The housing may be made of the similar materials to the other components of the bicycle, such as metals or hardened plastics. In addition, other embodiments may include a housing located closer to the upper rocker arm when the shock absorber device is located near the upper rocker arm.

Figure 20:
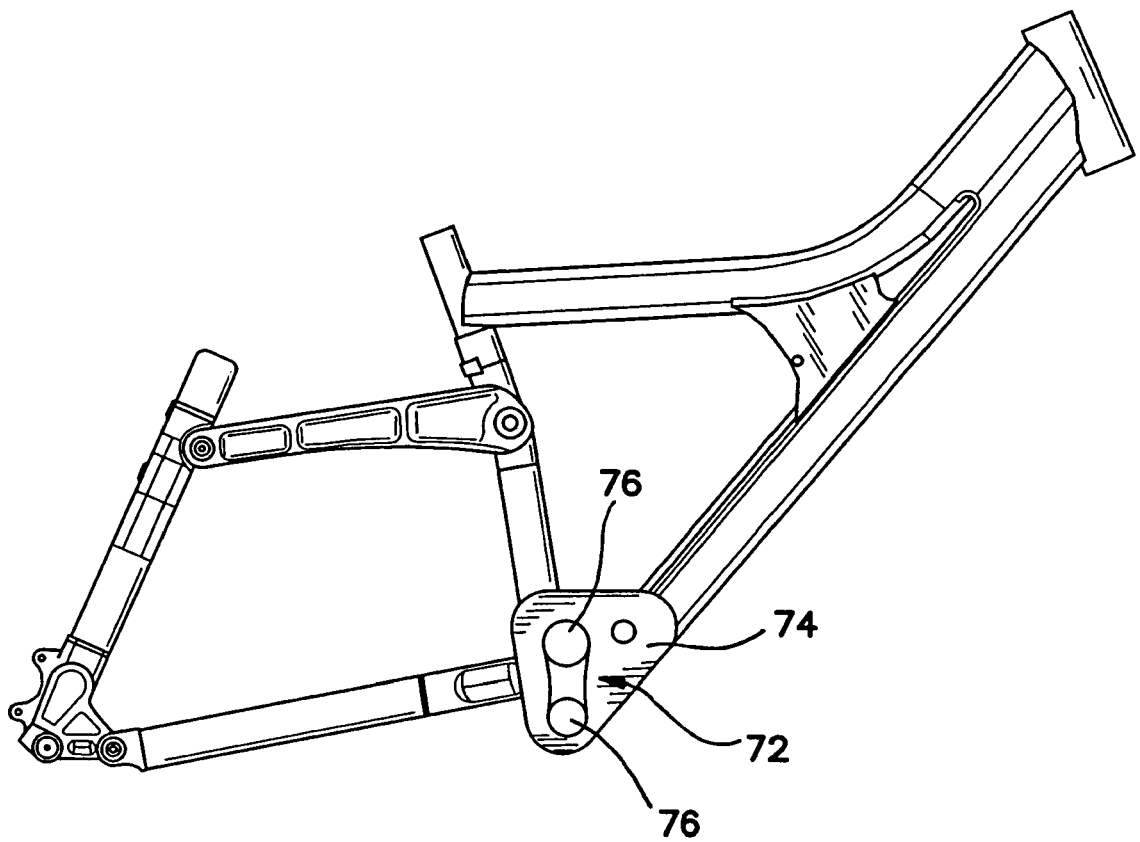
FIG. 20 is a side elevation view similar to FIG. 18 illustrating a suspension system of a bicycle with a housing containing a gear assembly.

In a further embodiment of the present bicycles, such as the embodiment of FIG. 20, a bicycle may comprise a gear box 72. Or, stated differently, the bicycle may comprise a gear housing 74 that contains one or more gears 76. In this figure, certain additional components of the bicycle, such as the shock absorber, wheels, seat, and the like have been omitted for purposes of clarity. In certain embodiments, the gear box 72 comprises a derailleur located in an enclosed housing. The gear box 72 also comprises a sprocket which is driven by the crank assembly, and may comprise a set of gears or a cogset. A set of pulleys, such as jockey pulleys, can be attached to the sprocket, which can slide along the bottom bracket shaft to shift the chain across the cogset. The gear box can be mounted to the frame near the bottom bracket. Providing a gear box on the present bicycles provides advantages such as reduced contamination of the gear assemblies compared to conventional gear systems without a housing, shifting without pedaling since the freewheel is located near the crank assembly, precise drive-sprocket placement to help reduce pedaling torque since the final drive sprocket can be placed close to pivot point of the lower swing arm, and reduced derailment of the chain since a short chain is provided in the box, in combination with the tracking of the chain torque line described herein. The gear box can thus be understood to be an integrated transmission. The gear box enables the chain or belt drive of the bicycle to power the rear wheel by the rider's pedaling without having any shifting duties since the shifting would be provided by the gears within the gear box. Examples of gear boxes been developed by companies such as Honda and Be One Bikes. Examples of other transmission systems which can be provided as components of the present bicycles include, without limitation, continuously variable transmissions, as disclosed in U.S. Pat. Nos. 6,689,012; 6,676,559; 6,551,210; and U.S. Pat. Publication 2005/0153809, the contents of which are hereby incorporated by reference in their entireties. Some transmission systems described in these references are available from Fallbrook Technologies, Inc., (Fallbrook, Calif.).

Providing one or more components of the present bicycles in housings can help reduce contamination of the components to dirt, water, and other substances that can reduce performance of those components. Preferably, the housings are light weight so as to reduce overweighting the bicycle, and are strong enough to withstand impacts, and are attached securely to the bicycle. Housings are also effective in reducing packaging requirements by permitting bicycle frames and components to be produced on a smaller scale relative to bicycles without housings.

The present bicycles, including the rear wheel suspension systems, may be produced using conventional methods and conventional materials readily known and available to persons of ordinary skill in the art. As discussed herein, the particular configurations of the components of the rear wheel suspension system take into account the position of the instant center in a laden condition of the bicycle and the ability to move the instant center to track the chain force torque line as discussed herein. For example, the present bicycles and suspension systems may be produced by machining metal components, such as anodized aluminum, titanium, steel, and other similarly light weight yet durable materials including composites. The specific position and orientation of the various components of the suspension system and bicycle in general may be first designed using a computer running computer aided drafting software and the like.

By riding the bicycles, especially over rugged terrain, a rider can notice substantial improvements in the performance of the bicycle relative to existing bicycles. This enhanced performance may include one or more of reduced "bobbing" as the rider pedals the bike, enhanced brake torque isolation, enhanced anti-squat, as well as enhanced abilities to ascend and descend offroad trails.

While this invention has been described with respect to various specific examples and embodiments, it is to be understood that the invention is not limited thereto and that it can be variously practiced within the scope of the following claims.

What is claimed is:

1. A bicycle, comprising
    a main frame, which comprises a top tube, a down tube positioned below the top tube, a seat tube, and a bottom bracket;
    a rear wheel suspension system which comprises an upper rocker arm comprising a rearward pivot point and a forward pivot point, the upper rocker arm forward pivot point providing a connection between the upper rocker arm and the main frame, a lower rocker arm comprising a rearward pivot point and a forward pivot point, the lower rocker arm forward pivot point providing a connection between the lower rocker arm and the main frame, a seat stay pivotally connected to the rearward pivot point of the upper rocker arm and pivotally connected to the rearward pivot point of the lower rocker arm, and a shock absorber apparatus comprising a bell crank linkage device, the shock absorber apparatus being coupled to the main frame and the rear wheel suspension system of the bicycle, the suspension system tracks a chain force torque line with an instant center, and
    a plurality of chain sprockets and a chain located thereon, at least one of the chain sprockets positioned in proximity of the rearward pivot point of the lower rocker arm, and at least one of the chain sprockets positioned in proximity of the bottom bracket,
    wherein the instant center is defined as a point at the intersection of a first imaginary straight line drawn through the rearward pivot point and the forward pivot point of the upper rocker arm, and a second imaginary straight line drawn through the rearward pivot point and the forward pivot point of the lower rocker arm, and wherein the instant center is located in front of the bottom bracket when the suspension system is not compressed, and a perpendicular distance between the instant center and the chain torque line decreases to zero as the suspension is compressed, and
    the chain force torque line is defined as a parallel line extending along the tension side of the chain while the chain is positioned on the chain sprockets of the bicycle.

2. The bicycle of claim 1, wherein the shock absorber apparatus is a shock absorber selected from the group consisting of a pull shock, a rotary torsion spring, and a push shock.

3. The bicycle of claim 1, wherein the bell crank linkage device includes an angled lever having a first pivot point located at one end of the lever and attached to the down tube of the main frame, a second pivot point located at another end of the lever and attached to a shock absorber, and a third pivot point located between the first and second pivot point, the third pivot point being attached to a rod pivotably connected to the lower rocker arm of the rear suspension system.

4. The bicycle of claim 1, wherein the upper rocker arm is pivotably attached to the seat tube at the forward pivot point of the upper rocker arm, and the lower rocker arm is pivotably attached to the seat tube at the forward pivot point of the lower rocker arm.

5. The bicycle of claim 1, wherein the shock absorber apparatus further comprises a rod pivotably connected to the bell crank and pivotably connected to the lower rocker arm.

6. The bicycle of claim 5, wherein the rod is a non-compressible, non-extendable member.

7. The bicycle of claim 1, wherein the bell crank is pivotably attached to the down tube of the main frame.

8. The bicycle of claim 1, wherein the shock absorber apparatus is a shock absorber selected from the group consisting of pull shocks and push shocks.

9. The bicycle of claim 1, wherein the lower rocker arm is pivotably attached to the seat tube at an area located above a bottom bracket of the main frame.

10. The bicycle of claim 1, wherein the seat stay has an upper end and a lower end, and the lower rocker arm is attached to the lower end of the seat stay, and the upper rocker arm is attached to an area located between the upper end and lower end of the seat stay.

11. The bicycle of claim 1, wherein the upper rocker arm and the lower rocker arm are attached to the main frame without extending forward beyond the seat tube.

* * * * *